US012760787B2

(12) United States Patent
Wahli et al.

(10) Patent No.: US 12,760,787 B2
(45) Date of Patent: Oct. 13, 2026

(54) GUIDANCE SYSTEM

(71) Applicant: MPS Micro Precision Systems AG, Biel/Bienne (CH)

(72) Inventors: Vincent Wahli, Port (CH); Julien Chenal, Bienne (CH)

(73) Assignee: MPS Micro Precision Systems AG, Biel/Bienne (CH)

( * ) Notice: Subject to any disclaimer, the term of this patent is extended or adjusted under 35 U.S.C. 154(b) by 0 days.

(21) Appl. No.: 18/951,438

(22) Filed: Nov. 18, 2024

(65) Prior Publication Data

US 2025/0198488 A1 Jun. 19, 2025

(30) Foreign Application Priority Data

Dec. 19, 2023 (EP) .................................... 23217960

(51) Int. Cl.
*F16H 25/20* (2006.01)
*F16C 29/04* (2006.01)

(52) U.S. Cl.
CPC ......... *F16H 25/2015* (2013.01); *F16C 29/04* (2013.01); *F16H 2025/204* (2013.01)

(58) Field of Classification Search
CPC ....................... F16H 25/2015; F16H 2025/204
See application file for complete search history.

(56) References Cited

U.S. PATENT DOCUMENTS 4,637,738 A 1/1987 Barkley
4,834,353 A * 5/1989 Chitayat ................ F16C 29/00 269/73

FOREIGN PATENT DOCUMENTS

CN 202447906 U * 9/2012
DE 19805974 C1 5/1999
GB 2334312 B 12/1999

OTHER PUBLICATIONS

Machine translation of CN-202447906-U (Year: 2012).*

* cited by examiner

*Primary Examiner* — Randell J Krug
(74) *Attorney, Agent, or Firm* — BLANK ROME LLP

(57) ABSTRACT

A guidance system (100) for guiding the displacement of a movable element (13) with respect to a fixed element (14). The system includes a linear actuator (6), the fixed element (14) comprising a main and a secondary guide axis (5, 4), the movable element (13) being arranged to be displaced along a first axis (z). A first rolling bodies guide device (50) cooperating with the main guide axis (5), arranged to block four degrees of freedom of the movable element, a second rolling bodies guide device (40) cooperating with the secondary guide axis (4), arranged to block a rotation of the movable element about a third axis (z). The fixed element (14) or the movable element (13) are arranged to generate a magnetic force which is arranged to reduce or avoid a clearance, thereby enabling guidance with little or no clearance.

11 Claims, 14 Drawing Sheets

GUIDANCE SYSTEM

RELATED APPLICATION

This application claims priority to European Application No. 23217960.6, filed Dec. 19, 2023. The contents of this application is hereby incorporated by reference in its entirety.

TECHNICAL FIELD

The present invention concerns a guidance system for guiding the displacement of a movable element with respect to a fixed element, for example and in a non-limiting way the displacement of a carriage (or trolley) with respect to a frame. In particular, the present invention concerns a guidance system intended for high-precision positioning applications, namely for applications in which the positioning precision is less than or equal to 50 μm, in particular less than or equal to 10 μm, for example less than or equal to 1 μm. More specifically, the present invention relates to a guidance system which uses a magnetic force to enable guidance with little or no clearance (or play).

RELATED ART

Guidance systems for guiding the displacement of a movable element with respect to a fixed element, e.g. and in a non-limiting way the displacement of a trolley with respect to a frame, are known.

Known guidance systems comprise:

- a linear actuator
- a fixed element comprising a single guide axis,
- a movable element arranged to be displaced (with a translational movement) by the linear actuator with respect to the fixed element along a first axis (e.g. the z axis), the movable element comprising a guide device cooperating with the main guide axis and arranged to block five degrees of freedom of the movable element.

The five degrees of freedom are:

- a translation of the movable element along a second axis, e.g. the x axis,
- a translation of the movable element along a third axis, e.g. the y axis,
- a rotation of the movable element about the second axis (x),
- a rotation of the movable element about the third axis (y),
- a rotation of the movable element about the first axis (z).

These known systems are not suitable for precision positioning applications. Furthermore, they are not rigid. Finally, they require significant displacement forces to move the movable element and their accuracy is often dependent on the operating temperature due to possible thermal expansion. Known guidance systems can also be expensive to manufacture.

SHORT DISCLOSURE OF THE INVENTION

An aim of the present invention is to provide a guidance system that overcomes the shortcomings and limitations of the state of the art.

Another aim of the invention is to provide a guidance system adapted to precision positioning applications.

Another aim of the invention is to provide a guidance system that is more rigid than known guidance systems.

Another aim of the invention is to provide a guidance system which requires a lower displacement force than the displacement force required by known guidance systems.

Another aim of the invention is to provide a guidance system which is less dependent on the operating temperature than known guidance systems.

Another aim of the invention is to provide a guidance system which is less expensive to produce than known guidance systems.

Another aim of the invention is to provide a guidance system which is an alternative to known guidance systems.

According to the invention, these aims are attained by the object of the attached claims, and especially by a guidance system according to claim 1, whereas dependent claims deal with alternative and preferred embodiments of the invention.

The guidance system for guiding the displacement of a movable element with respect to a fixed element according to the invention comprises:

- a linear actuator,
- the fixed element comprising
  - a main guide axis,
  - a secondary guide axis,
- the movable element being arranged to be displaced by the linear actuator with respect to the fixed element along a first axis e.g. the z axis, the movable element comprising:
  - a first rolling bodies guide device cooperating with the main guide axis, arranged to block four degrees of freedom of the movable element, the four degrees of freedom comprising a translation along a second axis (x), a translation along a third axis (y), a rotation about the second axis (x) and a rotation about the third axis (y),
  - a second rolling bodies guide device cooperating with the secondary guide axis, arranged to block a rotation of the movable element about a third axis (z).

In one preferred embodiment, the first, second and third axes are the axes of a three-dimensional Cartesian system.

In this context, the expression “guide axis” designates a physical axis or a rail.

In this context, the expression “rolling bodies guide device” refers to a device which comprises rolling bodies, in order to facilitate a relative movement.

The rolling bodies guide device can comprise (at least) a first element and (at least) a second element. In this case, the rolling bodies are held between the first and the second elements and facilitate a relative movement of the first element with respect to the second element, or vice-versa.

In this context, the expression “rolling body” refers to any body which can roll, for example and in a non-limiting way, a ball, a roller (for example a cylindrical roller, a conical roller, etc.), a needle, etc.

A rotary or rolling bearing is an example of a rolling bodies guide device. It generally comprises (at least) one outer ring (the first element), (at least) one inner ring (the second element, which generally comprises two parts fixed together), and rolling bodies held between the outer ring and the inner ring. In some cases, a cage may be used to space the rolling bodies between the rings. The cage can also provide additional functions to the spacing of the rolling bodies, for example and in a non-limiting way, a locking function.

The number of contact points (e.g. when the rolling bodies are balls) or contact lines (e.g. when the rolling bodies are rollers) of the rolling bodies with the rings may vary according to the type of bearing.

The surface on which the rolling bodies roll is generally referred to as "raceway". It supports the loads (axial and/or radial) applied to the bearing.

A linear bearing is another example of a rolling bodies guide device. It generally comprises a sleeve (the first element), a shaft (the second element) and rolling bodies held between the sleeve and the shaft. A linear bearing may also include a cage which serves to hold the rolling bodies and allow them to circulate. In this case, the cage does not act as a separator for the rolling elements. There is also a configuration in which the rolling bodies are inserted into a cage which acts as a separator for the rolling bodies. In this case, there is no circulation of the rolling bodies.

In general, there are two main types of linear bearing with rolling bodies: the recirculating track bearing (which does not limit the stroke length), and the ball bushing, which comprises of inner and outer bushes and a ball cage). This version is easier to produce and the fact that the balls are not getting recirculated, it provides a smoother motion. Indeed, the balls are always loaded while in the recirculated version, the balls are changing between the two status loaded and unloaded. This can generate an error that can be measured in a micrometric level. The drawback of this concept is the limited stroke.

In this context, the expression "guide device cooperating with a guide axis" indicates that (at least a part of) the guide device is (at least partially) on or around the guide axis.

According to the invention, there is a clearance between the main guide axis and the first rolling bodies guide device and/or between the secondary guide axis and the second rolling bodies guide device.

According to the invention, the fixed element or the movable element comprises a first magnet, and the movable element respectively the fixed element comprises a ferromagnetic support and/or a second magnet, wherein the first magnet and the ferromagnetic support respectively the second magnet are arranged to generate a magnetic force which is arranged to reduce or avoid this clearance, thereby enabling guidance with little or no clearance.

The first magnet and the ferromagnetic support and/or the first magnet and the second magnet are separated by an airgap. In one embodiment, the airgap's length (i.e. its dimension along the y axis) depends on the application of the claimed guidance system.

The first magnet and the ferromagnetic support and/or the second magnet are at the main guide axis and/or at the secondary guide axis.

In one embodiment, the first magnet and/or the second magnet is (are) permanent magnet(s).

In one embodiment, the clearance between the main guide axis and the first rolling bodies guide device is minimized on the main guide axis (wherein the rolling bodies are preferably placed at ±45° with regard to an axis perpendicular to a main base of the guiding system); the clearance between the secondary guide axis and the second rolling bodies guide device is minimized on the secondary guide axis (wherein the rolling bodies are preferably placed at 0° with regard to the axis perpendicular to a main base of the guiding system), so as to ensure that only one row of rolling bodies active on the secondary guide axis.

In one preferred embodiment, when there is a clearance between the main guide axis and the first rolling bodies guide device and between the secondary guide axis and the second rolling bodies guide device, there is a first magnet and a corresponding ferromagnetic support and/or second magnet per guide axis, and therefore a first magnet and a corresponding ferromagnetic support and/or second magnet at the main guide axis, and a first magnet and a corresponding ferromagnetic support and/or second magnet at the secondary guide axis. The embodiment where there is a clearance in both axes requires two clearance compensation devices, but has the advantage of being able to extend the tolerances on the axis diameters.

The invention has the advantage over the known state of the art that the claimed guidance system is suitable for precision positioning applications since it enables guidance with little or no clearance.

Since the claimed guidance system comprises two axes, it is more rigid than known guidance systems.

The claimed guidance system is based on the presence of a clearance between the main guide axis and the first rolling bodies guide device and/or between the secondary guide axis and the second rolling bodies guide device, and the use of a magnetic force arranged to reduce or avoid this clearance, thereby enabling guidance with little or no clearance. This allows the claimed guidance system to require a displacement force lower than the displacement force required by known guidance systems.

In addition, the guidance provided by the claimed guidance system is independent of the operating temperature, as it is not negatively affected by thermal expansion.

Finally, the guidance system according to the invention allows to have wider tolerances for the dimensions of the guide axes, making them easier to select and/or cheaper to manufacture.

In one embodiment, the clearance is between a distal portion of the main guide axis and a distal portion of the first rolling bodies guide device and/or between a distal portion of the secondary guide axis and a distal portion of the second rolling bodies guide device. This clearance will be named in the following "first clearance".

In this context, the expression "distal portion" indicates a portion which is distal from the first magnet and from the ferromagnetic support and/or from the second magnet.

In this embodiment, the first magnet and the ferromagnetic support and/or the second magnet are arranged to generate a magnetic force which is arranged to reduce or avoid this first clearance. Due to this reduction or annulment, a second clearance between a proximal portion of the main guide axis and a proximal portion of the first rolling bodies guide device and/or between a proximal portion of the secondary guide axis and a proximal portion of the second rolling bodies guide device is created, so that there is no longer any contact between a proximal portion of the main guide axis and a proximal portion of the first rolling bodies guide device and/or between a proximal portion of the secondary guide axis and a proximal portion of the second rolling bodies guide device. However, this second clearance has little or no impact on the precision of the guidance system according to the invention.

In this context, the expression "proximal portion" indicates a portion which is proximal to the first magnet and to the ferromagnetic support and/or to the second magnet. In one preferred embodiment, the proximal portion is opposite to the distal portion.

In one embodiment, the main guide axis is parallel to the secondary guide axis.

In one embodiment, the main guide axis is longer than the secondary guide axis.

In one embodiment, the fixed element is a frame (or chassis), and movable element is a trolley.

In one embodiment, the movable element is arranged to hold a device, e.g. an optical objective.

In one embodiment, the guidance system comprises two spaced first rolling bodies guide devices cooperating with the main guide axis.

In one embodiment, the first rolling bodies guide device and/or the second rolling bodies guide device is a (rolling or linear) bearing, e.g. a N contact points bearing, N being an integer positive number. In one embodiment, N=4.

In one embodiment, the first rolling bodies guide device is offset, e.g. by 45° (with a possible tolerance e.g. of ±10°), with respect to the secondary rolling bodies guide device.

In one embodiment, the second rolling bodies guide is a rolling bodies' track along the secondary guide axis.

In one embodiment, the linear actuator comprises a screw-nut system, a ball screw, a cam, a connecting rod, a belt and/or a rack, etc.

In one embodiment, the guidance system comprises means for determining the position along the first axis (the z axis), those means being arranged for adding a preload on the first axis and/or for lowering or cancelling the clearance along the first axis.

In one embodiment, the means for determining the position along the first axis (the z axis) comprise one or more springs, e.g. one spring for each guide axis.

In one embodiment, the means for determining the position along the first axis (the z axis) comprise a third magnet and a third ferromagnetic support.

SHORT DESCRIPTION OF THE DRAWINGS

Exemplar embodiments of the invention are disclosed in the description and illustrated by the drawings in which.

EXAMPLES OF EMBODIMENT(S) OF THE PRESENT INVENTION

In the following description, reference will be made, for simplicity's sake, to a magnetic force between a (first) magnet and a ferromagnetic support. It should be understood, however, that the invention is not limited to such a magnetic force, but also includes (in complement or in alternative) a magnetic force between the first magnet and a second magnet.

Figure 1:
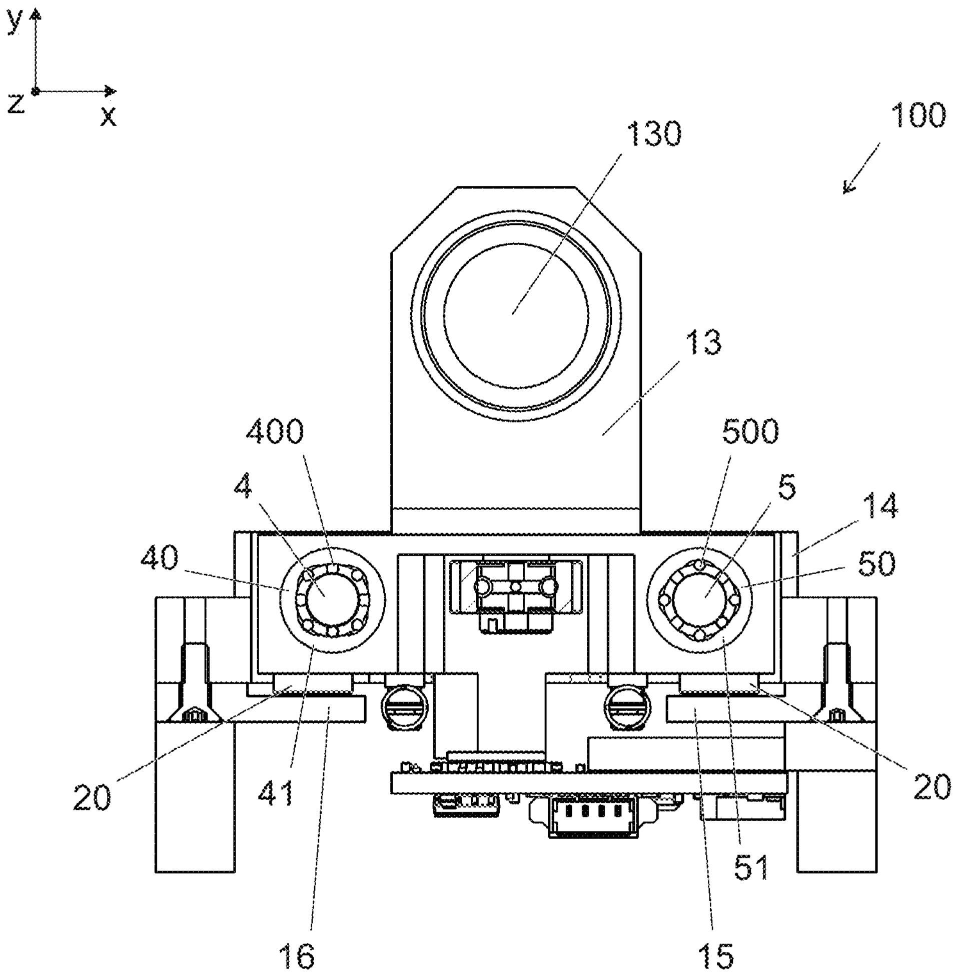
FIG. 1 illustrates schematically a cut section of an embodiment of a guidance system according to the invention.

FIG. 1 illustrates schematically a cut section of an embodiment of a guidance system 100 according to the invention.

The guidance system 100 is arranged for guiding the displacement of a movable element 13 with respect to a fixed element 14 and comprises:

- a linear actuator (which could comprise e.g. a cam 6, visible on FIG. 3),
- the fixed element 14, which comprises:
  - a main guide axis 5,
  - a secondary guide axis 4,
- the movable element 13, which is arranged to be displaced by the linear actuator with respect to the fixed element 14 along a first axis e.g. the z axis (visible on FIG. 3), the movable element 13 comprising:
  - a first rolling bodies guide device 50 cooperating with the main guide axis 5, arranged to block four degrees of freedom of the movable element,
  - a second rolling bodies guide device 40 cooperating with the secondary guide axis 4, arranged to block a rotation of the movable element about a third axis (z).

The four degrees of freedom comprise a translation along a second axis (x), a translation along a third axis (y), a rotation about the second axis (x) and a rotation about the third axis (y).

In this embodiment, the fixed element 14 is a frame (or chassis), and movable element 13 is a trolley, which is arranged to hold a device, e.g. an optical objective. In the illustrated embodiment, it comprises a portion with a receptacle 130 arranged for holding a device as an optical objective.

In this context, the expression "guide axis" designates a physical axis or a rail. Those guide axes are visible in particular on FIG. 3.

Figure 3:
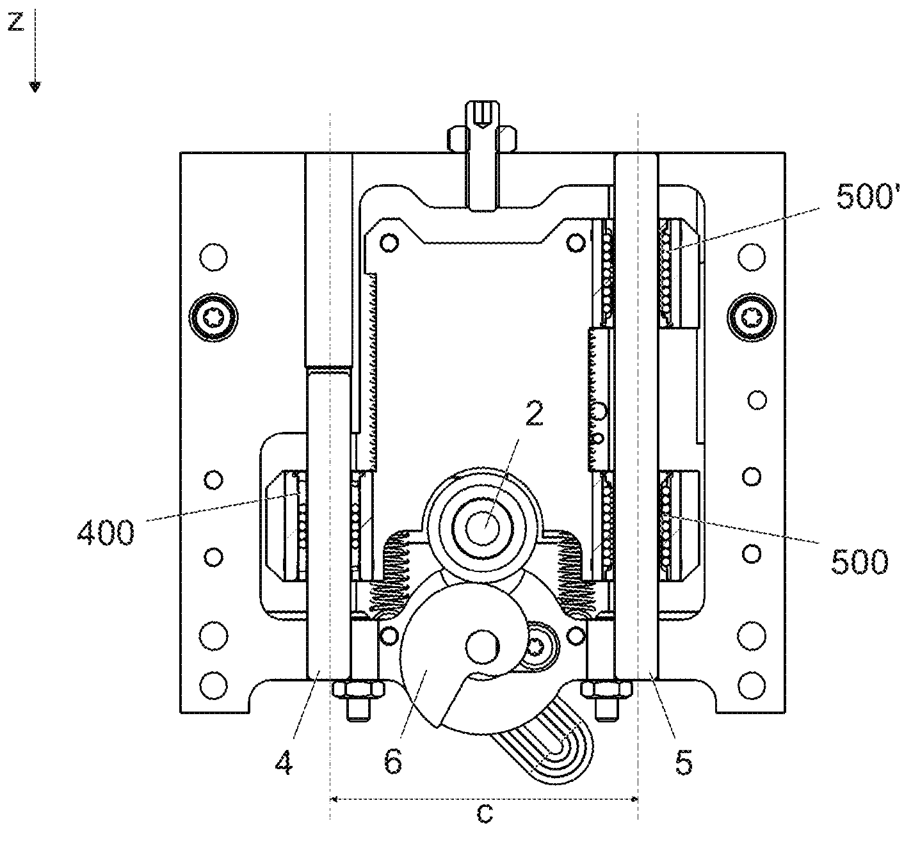
FIG. 3 illustrates schematically another cut section of an embodiment of a guidance system according to the invention.

In one embodiment, the main guide axis 5 is parallel to the secondary guide axis 4, as visible e.g. on FIG. 3.

In one embodiment, the main guide axis 5 is longer than the secondary guide axis, as visible e.g. on FIG. 3.

In this context, the expression "rolling bodies guide device" refers to a device which comprises rolling bodies, in order to facilitate a relative movement.

In this context, the expression "rolling body" indicates any body which can roll, for example and in a non-limiting way, a ball, a roller (for example a cylindrical roller, a conical roller, etc.) a needle, etc.

A linear bearing is a (non-limitative) example of a rolling bodies guide device. It generally comprises a sleeve (the first element), a shaft (the second element) and rolling bodies held between the sleeve and the shaft. A linear bearing may include a cage which serves to hold the rolling bodies and allow them to recirculate. In this case, the cage does not act as a separator for the rolling elements.

In the embodiment of FIG. 1, there is a first linear bearing 50 which comprises a sleeve 51, a shaft (which is a portion of the main axis 5) and rolling bodies 500 held between the sleeve and this portion of the main axis 5.

Figure 2:
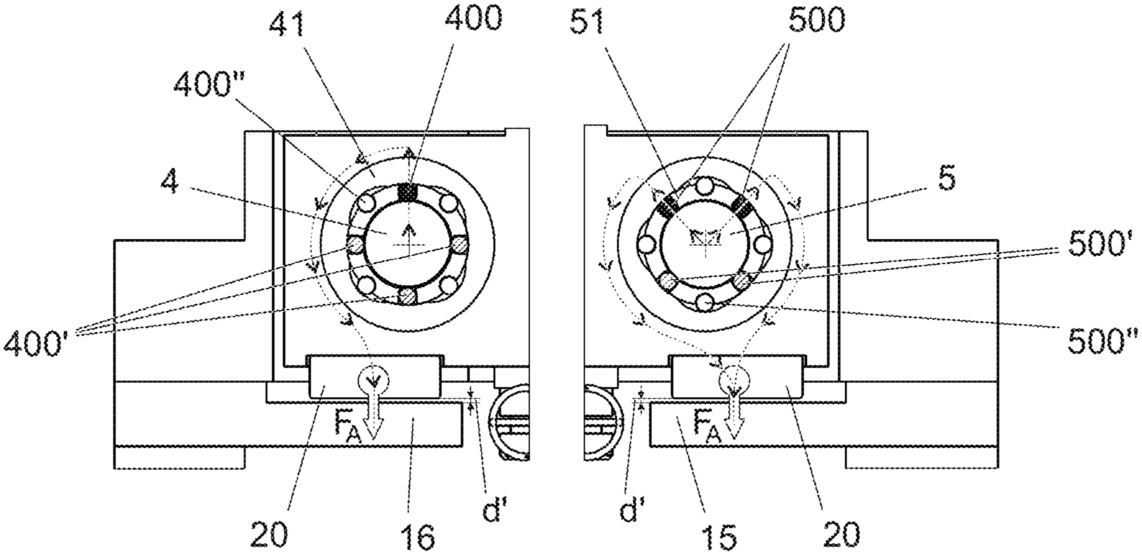
FIG. 2 illustrates a detail of the secondary guide axis (on the left) and of the main guide axis (on the right) of the guidance system of FIG. 1.

In the embodiment of FIG. 2, there is a second linear bearing 40 which comprises a sleeve 41, a shaft (which is a portion of the secondary axis 4) and rolling bodies 400 held between the sleeve and this portion of the secondary axis 4.

In one embodiment, the first and/or the second rolling bodies guide device 50, 40 is a N contact points bearing, N being an integer positive number. In one embodiment, N=4. However, this number is not limitative and rolling bodies guide device with a different number of contact points could be used as well, as N=3, N=7, etc. Moreover, the number of contact points of the first rolling bodies guide device 50 could be different from the number of contact points of the second rolling bodies guide device 40.

In a not-claimed embodiment, the fixed element comprises the two rolling bodies guide devices and the movable element comprises the two guide axes: however, this embodiment has the disadvantage: that the guide axes may protrude from the fixed element and take up more space than in the claimed guidance system.

According to the invention and with reference to FIG. 1, a clearance (not illustrated) exists between the main guide axis 5 and the first rolling bodies guide device 50 and between the secondary guide axis 4 and the second rolling bodies guide device 400.

According to the invention, the fixed element or the movable element comprises at least a magnet 20 (two in the embodiment of FIG. 1), and the movable element respectively the fixed element comprises at least a ferromagnetic support 15, 16 (two in the embodiment of FIG. 1). In particular, there is one magnet 20 and one ferromagnetic support 15, 16 for each guide axes 4, 5.

In the embodiment of FIG. 1, each magnet has a cylindrical shape, and it is a magnetic disc.

According to the invention, the magnet(s) 20 and the ferromagnetic support(s) 15, 20 are arranged to generate a magnetic force which is arranged to reduce or avoid this clearance, thereby enabling guidance with little or no clearance.

With respect to what is known in the art, the invention provides the advantage that the claimed guidance system 100 is adapted to precision positioning applications, since it enables guidance with little or no clearance.

Since the claimed guidance system comprises two axes 4, 5, it is more rigid than known guidance systems.

The claimed guidance system is based on the presence of a clearance between the main guide axis 5 and the first rolling bodies guide device 50 and/or between the secondary guide axis 4 and the second rolling bodies guide device 40, and the use of a magnetic force arranged to reduce or avoid this clearance, thereby enabling guidance with little or no clearance. This allows the claimed guidance system 100 to require a displacement force lower than the displacement force required by known guidance systems. In particular, the displacement force required by the claimed guidance system 100 is around ten times lower than displacement force required by known guidance systems.

Moreover, the guidance provided by the claimed guidance system 100 is independent on the operating temperature since it is not affected by thermal expansion.

In one embodiment, the clearance is between a distal portion of the main guide axis 5 and a distal portion of the first rolling bodies guide device 50 and/or between a distal portion of the secondary guide axis 4 and a distal portion of the second rolling bodies guide device 40. This clearance will be named in the following "first clearance".

In this context, the expression "distal portion" indicates a portion which is distal from the magnet 20 and from the ferromagnetic support 15, 16.

FIG. 2 illustrates a detail of the secondary guide axis (on the left) and of the main guide axis (on the right) of the guidance system of FIG. 1.

In the embodiment of FIG. 2, the distal portion of the main guide axis 5 is the upper portion of the main guide axis 5 and the distal portion of the first rolling bodies guide device 50 is the upper portion of the first rolling bodies guide device 50. The same considerations apply for the secondary guide axis 4 and the second rolling bodies guide device 40.

The magnet 20 and the ferromagnetic supports 15, 16 are separated by an airgap d' and are arranged to generate a magnetic force which is arranged to reduce or avoid this first clearance. This magnetic force is an adhesion force $F_A$, illustrated in FIG. 2.

The movable element 13 is subject then to two forces, its weight acting at the centre of gravity (CG, illustrated e.g. on FIG. 4) and the adhesion forces $F_A$. The reactions to the supports are exerted on the tracks of the bearings at an angle depending on the arrangement of the tracks. The movable element 13, and then the sleeve(s) 41, 51 of the guide devices 40, 50 are then pulled downwards (i.e. to the magnet/ferromagnetic support) by the adhesion forces $F_A$ and this displacement reduce or avoid this first clearance. This displacement creates a second clearance (not illustrated) between a proximal portion of the main guide axis 5 and a proximal portion of the first rolling bodies guide device 50 and/or between a proximal portion of the secondary guide axis 4 and a proximal portion of the second rolling bodies guide device 40. However, this second clearance has little or no impact on the precision of the guidance system 100 according to the invention.

In this context, the expression "proximal portion" indicates a portion which is proximal to the magnet and to the ferromagnetic support. In one preferred embodiment, the proximal portion is opposite to the distal portion.

In the embodiment of FIG. 2, the proximal portion of the main guide axis 5 is the lower portion of the main guide axis 5 and the proximal portion of the first rolling bodies guide device 50 is the lower portion of the first rolling bodies guide device 50. The same considerations apply for the secondary guide axis 4 and the second rolling bodies guide device 40.

In other words, the guidance system according to the invention deliberately introduces the first clearance and reduces or eliminates it by using a magnetic force.

In the embodiment of FIG. 2, each rolling balls guide device 40 comprises at least one loaded ball 400, 500 (in black), at least two non-loaded ball 400',500' (in grey), some of them being circulating balls 400'', 500'' (in white).

Figure 14:
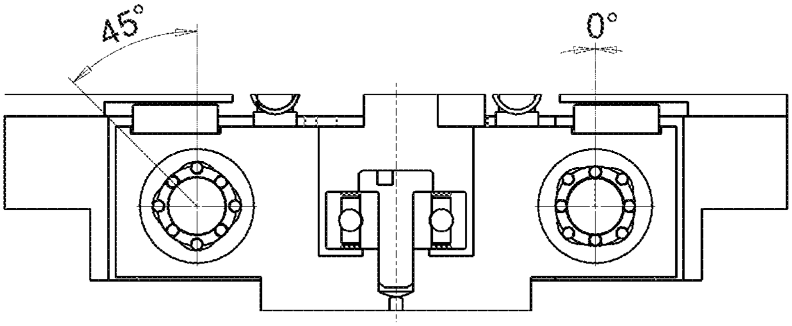
FIG. 14 illustrates a cut-view E-E of the guidance system of FIG. 13.

In the embodiment of FIG. 2, the rolling balls guide devices 40, 50 are offset, so as to efficiently distribute the supports of the movable element 13 on the axes 4, 5. In one preferred embodiment, the rolling balls guide devices 40, 50 are offset by 45°, as visible also on FIG. 14, since there are four contact points. The offset angle will depend on the number of contact points, e.g. it will be equal to 60° if there are three contact points, or equal to 36° if there are five contact points.

In one embodiment, there are three or four contact points since the fewer this number, the greater the horizontal component of the downforce, which makes the guidance more stable. In one embodiment, there are three rows of rolling bodies in contact, in particular two placed at ±45° with regard to an axis perpendicular to a main base of the guiding system on the main guide axis and one at 0° with regard to an axis perpendicular to a main base of the guiding system on the secondary guide axis.

In one embodiment, the first rolling bodies guide device 50 is arranged for guiding over more than 1.5 times the diameter of the main axis 5. For configurations where the centre of gravity CG of the movable element 13 is offset from the guide plane GP by a distance d, as visible in FIG. 4, and which require rapid positioning involving high accelerations a, e.g. an acceleration of 2G, wherein the positioning is precise and performed quickly, e.g. in a time interval less than 10 ms, it would be preferable to have two (or more) first rolling bodies guide devices 50, 50' on the main guide axis 5, separated by a distance b, as visible in FIG. 4.

In this context, the secondary guide axis 5 can also be referred to as the anti-rotation axis, since it locks the Oz degree of freedom. The degree of freedom that remains free is the translation along the z axis, which could be controlled by a transmission element such as a screw-nut system, a ball screw, a cam, a connecting rod, a belt, a rack, etc. This transmission element is generally connected to an actuator (as a motor), so as to form a linear actuator.

The greater the distance between the two axes 4, 5 (distance c in FIG. 3), the smaller the angular variation dθx due to alignment errors (parallelism, conicity of the axis, etc.) and/or to surface errors (roughness).

As a non-limiting example of the computation of the required adhesion force $F_A$, with a cylindrical magnet 20 of diameter 6 mm and height 2 mm made of neodymium N45 with a holding force of 7.4 N, a pure iron plate and an airgap d' of 0.2 mm, the adhesion force $F_A$ is 4.8 N.

Figure 4:
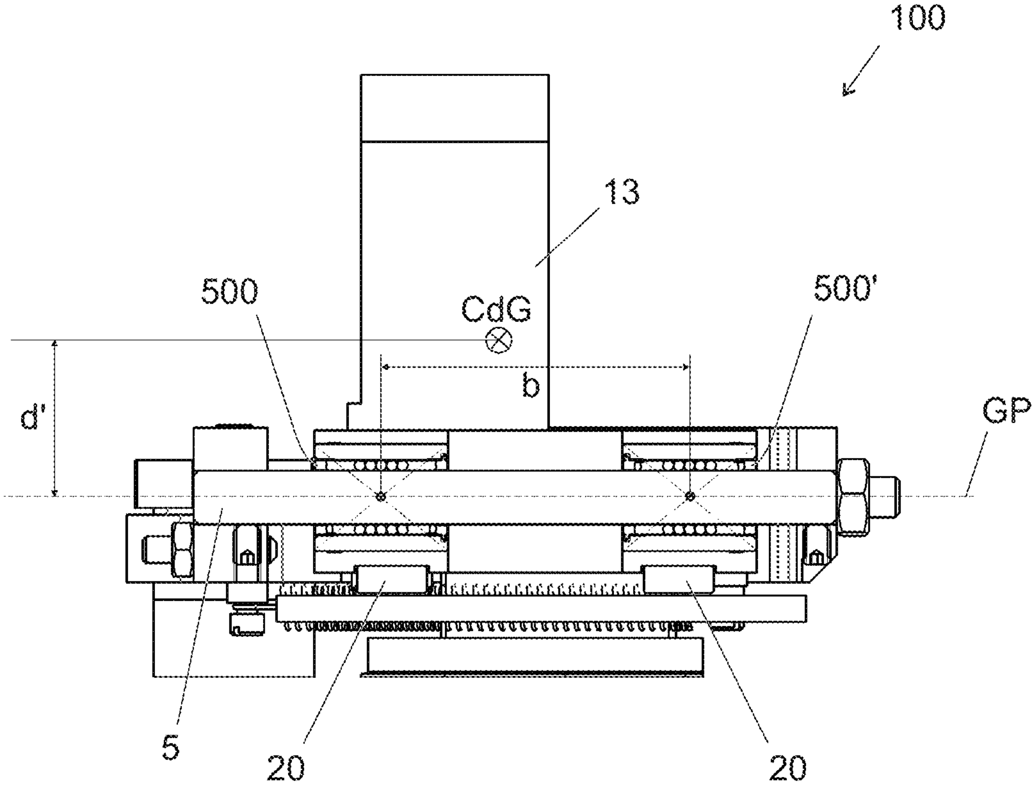
FIG. 4 illustrates a cut view of an embodiment of a guidance system according to the invention.
Figure 5:
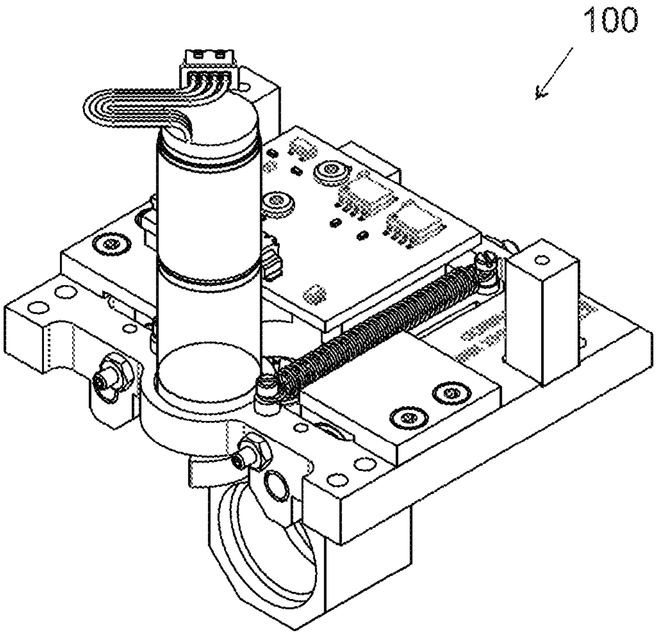
FIG. 5 illustrates a perspective view of an embodiment of a guidance system according to the invention.

If there are two linear bearings 50, 50' on the main axis 5, it is possible to use one magnet 20 per bearing, as visible e.g. on FIG. 4. In the current dimensioning example, the adhesion force $F_A$ multiplied by the distance b (between the two linear bearings 50, 50' on the main axis) should be greater than, preferably 1.5 times, the force moment equal to the product of the mass of the movable element 13, the maximum acceleration and the distance d between the guide plane GP and the centre of gravity CG of the movable element 13 (cf FIG. 4).

If the distance d is equal to 4.5 mm, the distance b is equal to 23 mm and the mass m is equal to 50 g, the maximum permissible acceleration is equal to 327 mm/s$^2$, as indicated in the formula (7) here below, deduced from formulas (1) to (6):

$$a_{\underset{adm}{max}} = \frac{F_{max}}{1.5 \cdot m} \tag{1}$$

$$M_{\underset{adm}{Fmax}} = F_{max} \cdot d = 1.5 \cdot m \cdot a_{\underset{adm}{max}} \cdot d \tag{2}$$

$$F_A \cdot b > M_{\underset{adm}{Fmax}} \tag{3}$$

$$F_A \cdot b > 1.5 \cdot m \cdot a_{\underset{adm}{max}} \cdot d \tag{4}$$

$$a_{\underset{adm}{max}} < \frac{F_A \cdot b}{1.5 \cdot m \cdot d} \tag{5}$$

-continued $$a_{\underset{adm}{max}} < \frac{4.8 \cdot 23}{1.5 \cdot 0.05 \cdot 4.5} \tag{6}$$

$$a_{\underset{adm}{max}} < 327 \text{ mm/s}^2 \tag{7}$$

As another example, for an acceleration of 1 m/s$^2$, a mass of 30 g at a distance d of 10 mm and a distance b of 30 mm, the adhesion force $F_A$ is given by the following formulas (8) to (10), the formula (8) being derived from formula (4):

$$F_A > \frac{1.5 \cdot m \cdot a_{\underset{adm}{max}} \cdot d}{b} \tag{8}$$

$$F_A > \frac{1.5 \cdot 0.03 \cdot 1000 \cdot 10}{30} \tag{9}$$

$$F_A > 15N \tag{10}$$

FIGS. 5 to 14 illustrate different views of an embodiment of a guidance system 100 according to the invention. The arrangement and/or the presence of some of the illustrated components like the screws 21 to 26, 30, 32, the nuts 31, 33, the pins 27, 28, the ruler 19, etc. is not limitative respectively necessary.

In one embodiment, the guidance system 100 comprises means for determining the position along the first axis (the z axis). In one embodiment, the means for determining the position along the first axis (the z axis) comprise one or more springs, e.g. one spring for each guide axis. A non-limitative example of those springs 18 is visible e.g. on FIG. 6.

In one embodiment, the tension of each spring 18 could be adjusted, e.g. using a movable spring clip 12 at one of its end.

Those spring 18 allow the (fixed) linear actuator 6 (a cam in FIG. 3) to be in contact with a spindle 2. However, the contact force could be not constant along the axes 4, 5. In addition the cam 6 could wear and the motor could be over-stressed. In a preferred embodiment, the preload could be obtained by a magnetic force (adhesion) between one or more magnets (not illustrated) and a ferromagnetic support (not illustrated). In particular one magnet is in or on the linear actuator 6 or the spindle 2, and the ferromagnetic support is in or on the spindle 2 respectively the linear actuator 6. This embodiment has the advantage of the application of a constant force along the axes 4, 5. In addition the cam 6 is less or not subject to wear and the motor is less or not over-stressed.

In the embodiment of FIGS. 5 to 14, there are two ferromagnetic supports 15, 16, one for each axis 4, 5. In this embodiment, the dimension and shape of the ferromagnetic supports 15, 16 are different from each other.

Figure 6:
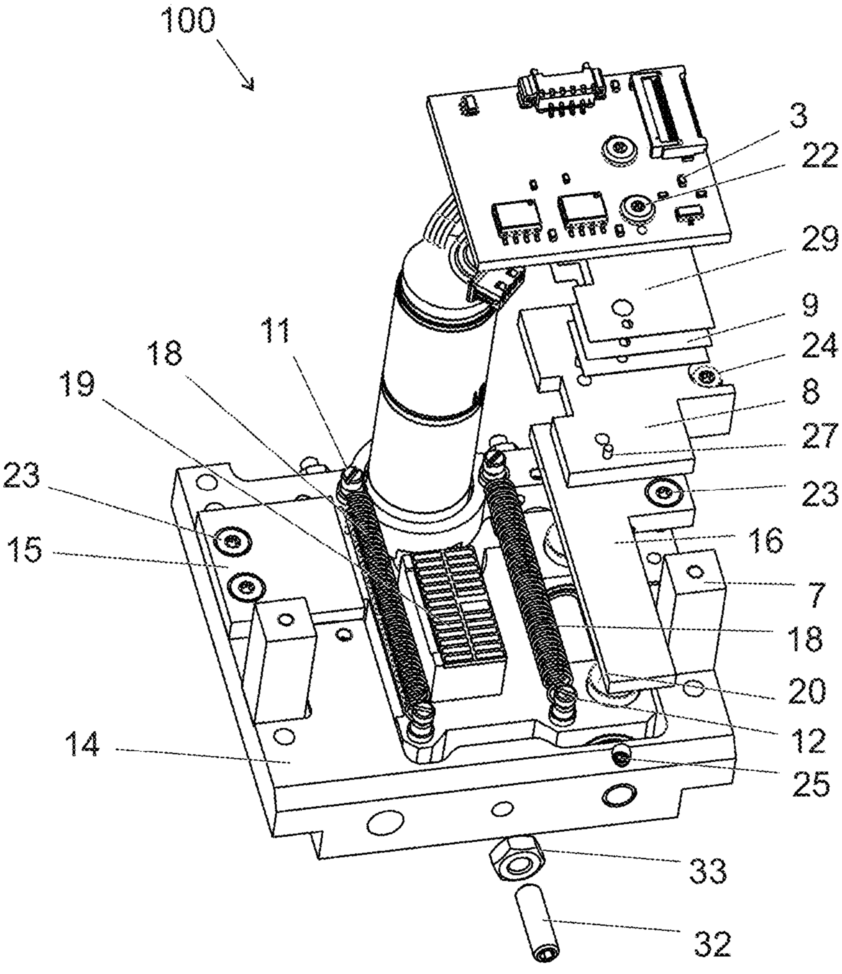
FIG. 6 illustrates an exploded view of the guidance system of FIG. 5.
Figure 7:
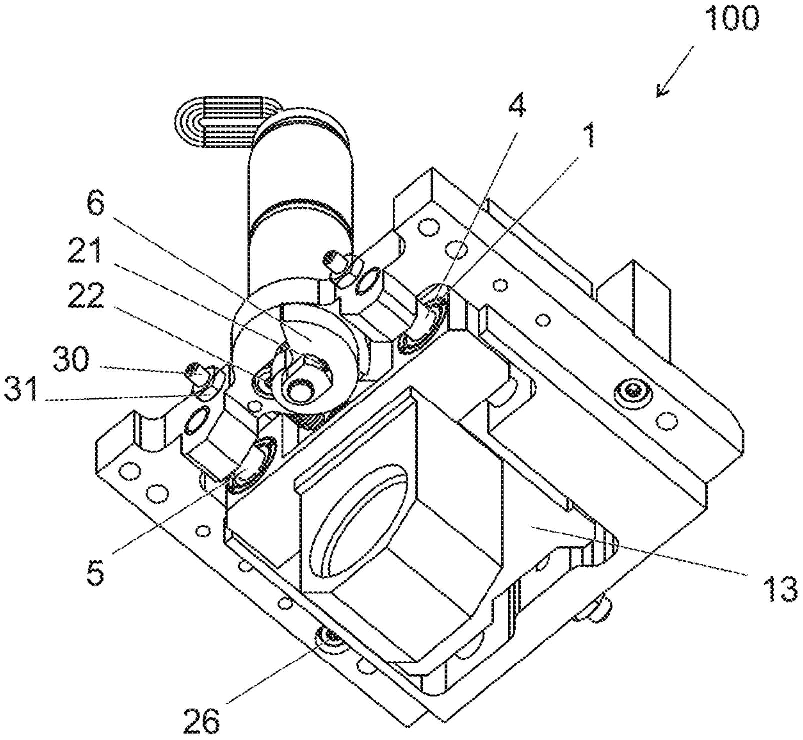
FIG. 7 illustrates another perspective view of the guidance system of FIG. 5.
Figure 8:
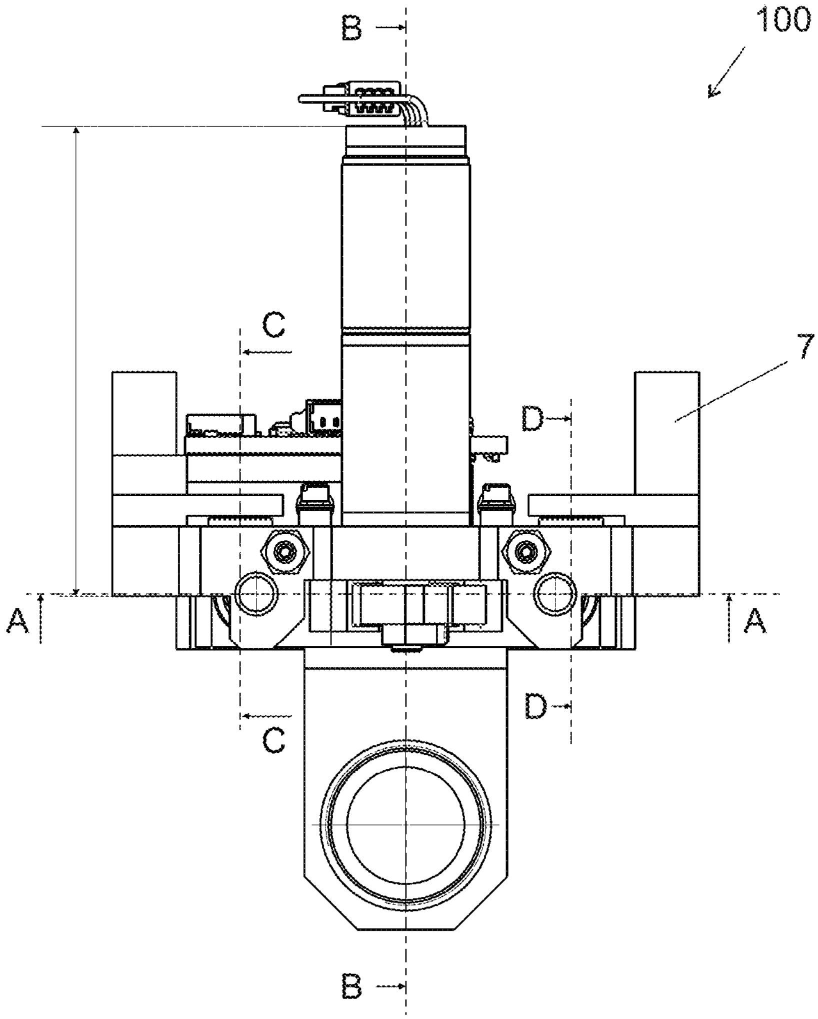
FIG. 8 illustrates a frontal view of the guidance system of FIG. 5.
Figure 9:
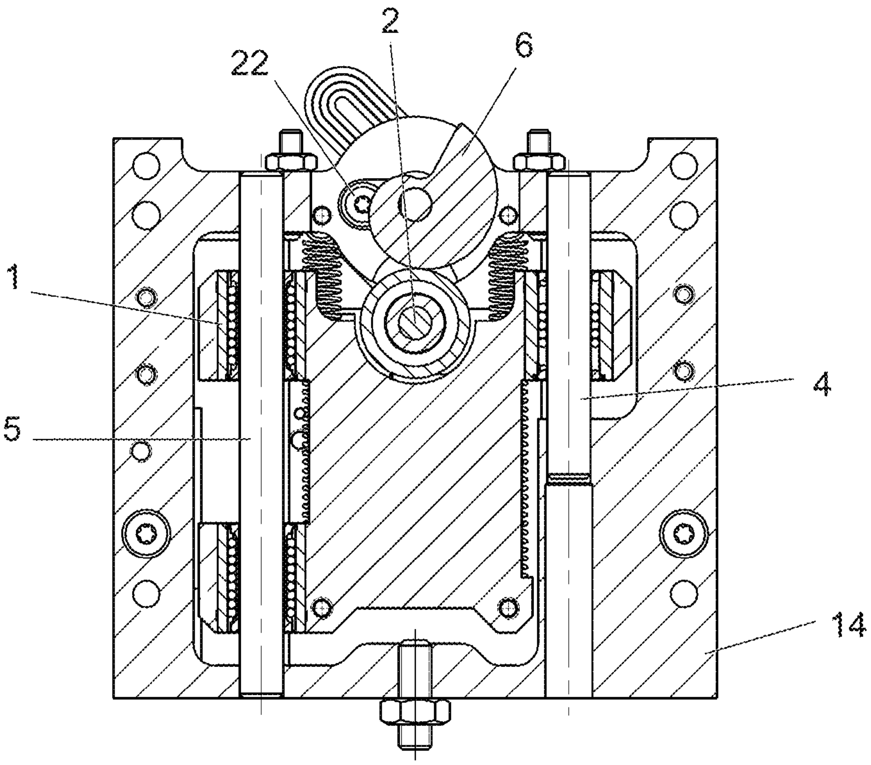
FIG. 9 illustrates a cut-view A-A of the guidance system of FIG. 8.
Figure 10:
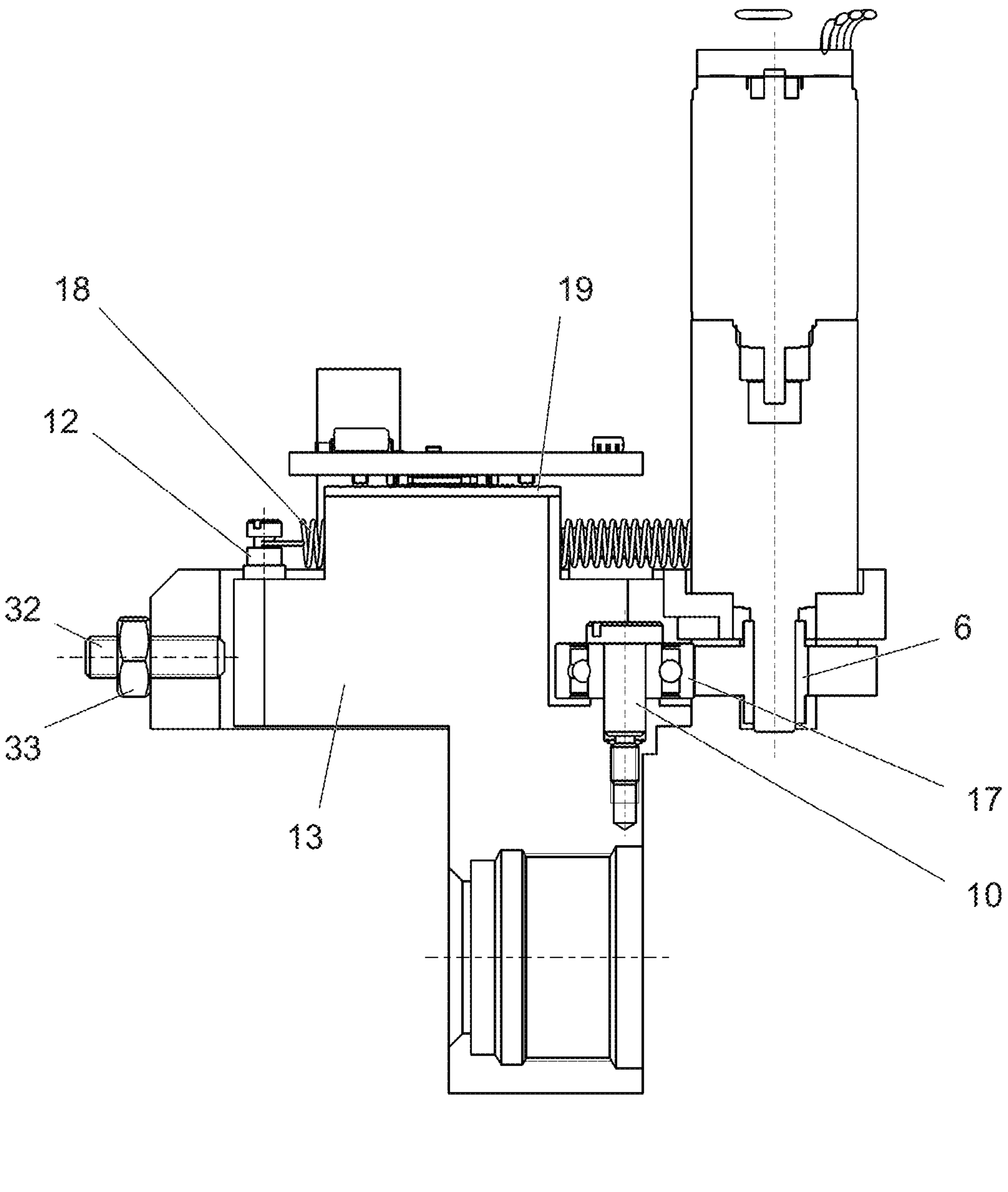
FIG. 10 illustrates a cut-view B-B of the guidance system of FIG. 8.
Figure 11:
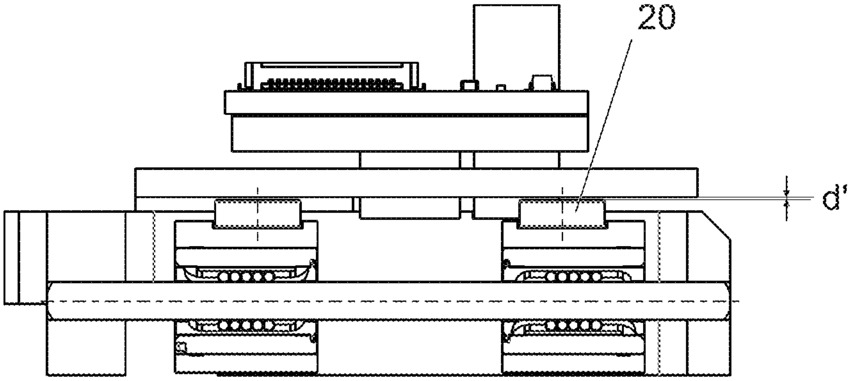
FIG. 11 illustrates a cut-view C-C of the guidance system of FIG. 8.
Figure 12:
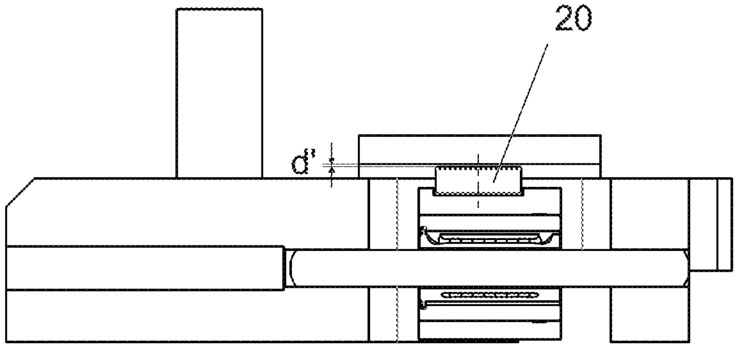
FIG. 12 illustrates a cut-view D-D of the guidance system of FIG. 8.
Figure 13:
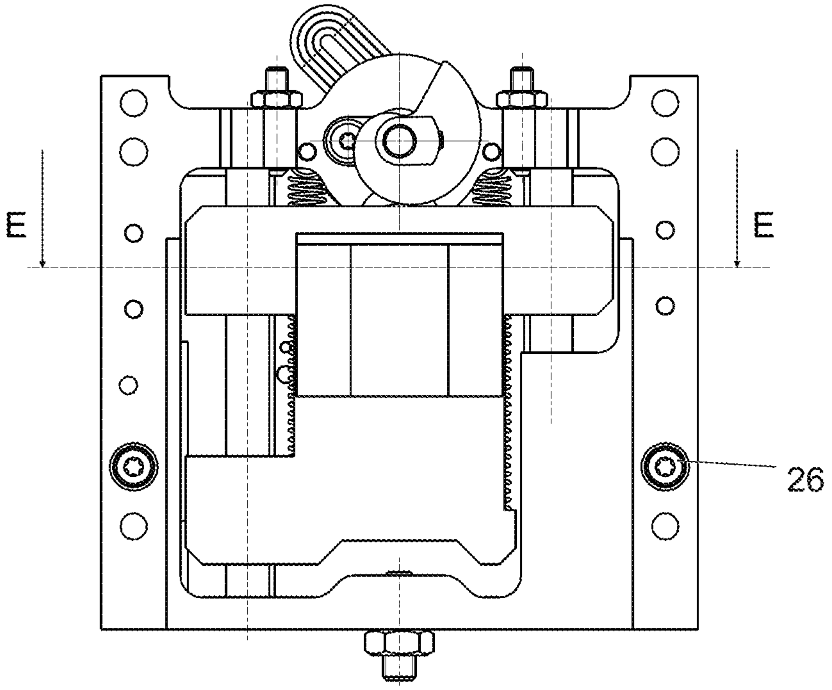
FIG. 13 illustrates a bottom view of the guidance system of FIG. 5.

The guidance system 100 could comprise also measuring means, as for example the PCB linear sensor 3, supported by a PCB support 8, via a PCB board spacer 7 and a PCB spacer 9 illustrated in FIG. 6, for measuring the displacement of the movable element 13.

Figure 15A:
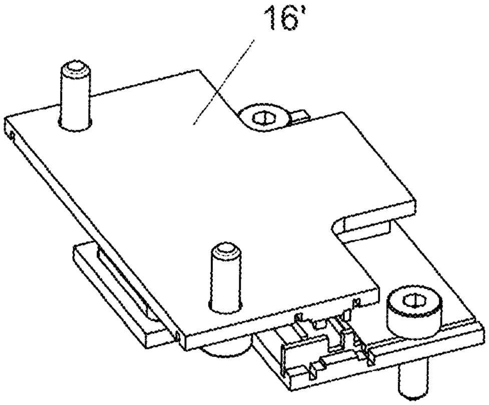
FIG. 15A illustrates a perspective view of a portion of the guidance system according to the invention, comprising an embodiment of the secondary guide axis.
Figure 15B:
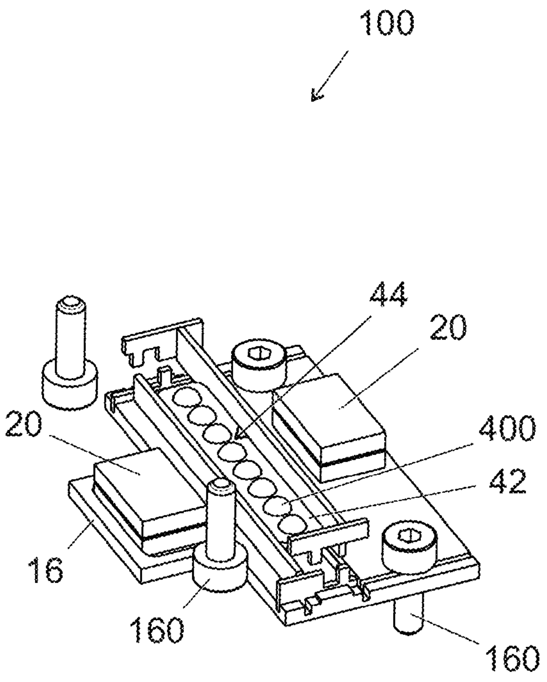
FIG. 15B illustrates a perspective view of some components of the portion of the guidance system of FIG. 15A.
Figure 16:
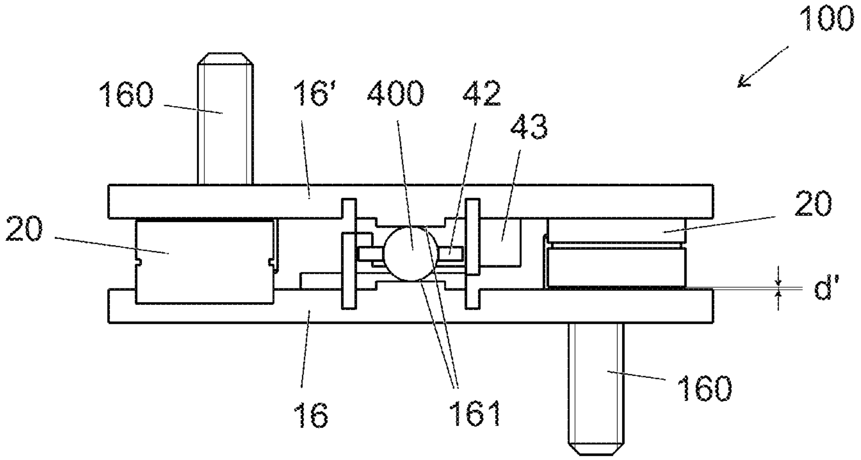
FIG. 16 illustrates a cut view of the portion of the guidance system of FIGS. 15A and 15B.

FIG. 15A illustrates a perspective view of a portion of the guidance system 100 according to the invention, comprising an embodiment of the secondary guide axis. FIG. 15B illustrates a perspective view of some components of the portion of the guidance system of FIG. 15A. FIG. 16 illustrates a cut view of the portion of the guidance system of FIGS. 15A and 15B. In this embodiment, the second rolling bodies guide is a rolling bodies' track 44 along the secondary guide axis.

When the rolling bodies guide device comprises several contact points, i.e. several tracks, only one track is used in the context of the present invention. Therefore, in one embodiment, the second rolling bodies guide device is replaced by a simple rolling bodies' track 44.

The number of the rolling bodies 400 in the rolling bodies' track 44 of FIG. 15B is not limitative and depends on the application.

In this embodiment, a cage 44 could be used for separating the rolling bodies 400. The guidance system 100 in this embodiment comprises two ferromagnetic supports 16, 16', substantially parallel, one on them being fixed (reference 16 in FIG. 16) and one of them mobile (reference 16' in FIG. 16). The inner surface of each ferromagnetic supports 16, 16', i.e. the surface facing the other ferromagnetic supports 16 respectively 16', is shaped so as to have at least a punctual contact with the rolling bodies 400, e.g. at a rectified surface 161. Magnets 20, e.g. magnet 20 polarised in the direction of thickness of the system 100, are separated by an airgap d' by the respective ferromagnetic support 16, 16' as in the previous embodiments. In this embodiment, the guidance system 100 comprises also fixation means 160.

Figure 18:
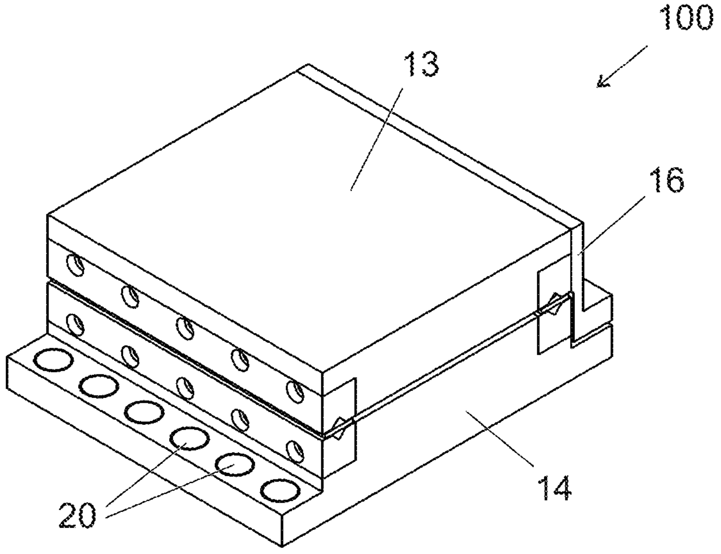
FIG. 18 illustrates a perspective view of the portion of the guidance system of FIG. 17.

FIG. 18 illustrates a cut view of an embodiment of a portion of the guidance system 100 according to the invention. FIG. 19 illustrates a perspective view of the portion of the guidance system of FIG. 18.

In this embodiment, cross-roller or ball rails are used as guide axes 4, 5. In this embodiment, the preload could be applied via radial screws (not illustrated) which are tightened with a torque determined in relation to the desired preload. However, those screws require high torque and create a non-constant force along the length of the axes. In a preferred embodiment, the preload could be obtained by a magnetic force (adhesion) between one or magnets 20 and a ferromagnetic support 15, 16. This embodiment has the advantage of the application of a constant force along the length of the axes 4, 5.

Figure 17:
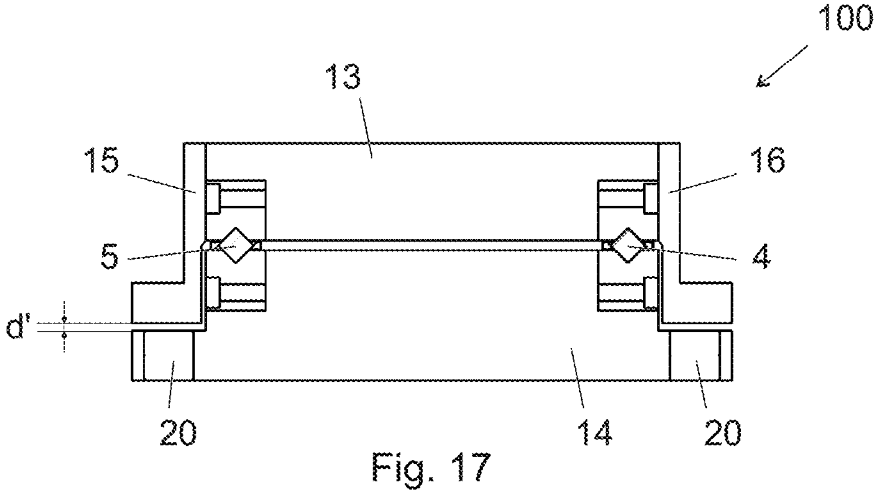
FIG. 17 illustrates a cut view of an embodiment of a portion of the guidance system according to the invention.

In the embodiment of FIG. 17, 18, the system comprises lateral ferromagnetic support 15, 16 having a L-shaped section, whose shortest leg is separated by an airgap d' from a respective magnets' 20 track in the fixed element 13.

REFERENCE SIGNS USED IN THE FIGURES

1 Linear bearing
2 Spindle
3 PCB Linear sensor
4 Secondary guide axis
5 Main guide axis
6 Cam
7 PCB board spacer
8 PCB support
9 PCB spacer
10 Bearing fixing screw
11 Fixed spring clip
12 Movable spring clip
13 Movable element
14 Fixed element
15 Ferromagnetic support
16 (Fixed) ferromagnetic support
16' (Mobile) ferromagnetic support
17 Bearing
18 (Tension) spring
19 Linear ruler
20 Magnet (magnetic disc)
21 to 26 Screw
27 Pin
28 Pin
29 Insulating spacer
30 Screw
31 Nut
32 Screw
33 Nut
40 Second rolling bodies guide device
41 Sleeve of the second rolling bodies guide device
42 Cage
43 Cage stop
44 Rolling bodies' track
50, 50' First rolling bodies guide device
51 Sleeve of the first rolling bodies guide device
100 Guidance system
130 Receptacle
160 Fixation means
161 Rectified surface
400, 500 Rolling bodies
400', 500' Rolling bodies
400", 500" Rolling bodies
b Distance between two first rolling bodies guide device
c Distance between the two axes 4, 5
CG Centre of gravity
d Distance from the CG to the GP
d' Airgap
GP Guide Plane
$F_A$ Adhesion force

The invention claimed is:

1. A guidance system for guiding the displacement of a movable element with respect to a fixed element, the guidance system comprising:
- a linear actuator,
- wherein the fixed element comprises:
  - a main guide axis,
  - a secondary guide axis,
- wherein the movable element is arranged to be displaced by the linear actuator with respect to the fixed element along a first axis, the movable element comprising:
- at least one first rolling bodies guide device cooperating with the main guide axis, arranged to block four degrees of freedom of the movable element, the four degrees of freedom comprising a translation along a second axis, a translation along a third axis, a rotation about the second axis, and a rotation about the third axis,
- a second rolling bodies guide device cooperating with the secondary guide axis, arranged to block a rotation of the movable element about the third axis,
- wherein there is a clearance between the main guide axis and the at least one first rolling bodies guide device and/or between the secondary guide axis and the second rolling bodies guide device,
- wherein one of the fixed element and the movable element comprises a first magnet,
- wherein one of the movable element and the fixed element comprises a ferromagnetic support and/or a second magnet,
- wherein the first magnet and the ferromagnetic support and/or the second magnet are arranged to generate a magnetic force which is arranged to reduce the clearance, thereby enabling guidance with a lower clearance or no clearance, and
- wherein the main guide axis is longer than the secondary guide axis.

2. The guidance system of claim 1, wherein the clearance is between a distal portion of the main guide axis and a distal portion of the at least one first rolling bodies guide device and/or between a distal portion of the secondary guide axis and a distal portion of the second rolling bodies guide device.

3. The guidance system of claim 1, wherein a first clearance is provided between the main guide axis and the at least one first rolling bodies guide device and a second clearance is provided between the secondary guide axis and the second rolling bodies guide device, wherein the first magnet and the ferromagnetic support and/or the second magnet are provided at the main guide axis, and wherein a third magnet and a second ferromagnetic support and/or a fourth magnet are provided at the secondary guide axis.

4. The guidance system of claim 1, wherein the main guide axis is parallel to the secondary guide axis.

5. The guidance system of claim 1, wherein the movable element is arranged to hold an optical component.

6. The guidance system of claim 1, wherein the guidance system comprises two spaced first rolling bodies guide devices cooperating with the main guide axis.

7. The guidance system of claim 1, wherein the at least one first rolling bodies guide device and/or the second rolling bodies guide device is/are a rolling bearing or a linear bearing.

8. The guidance system of claim 1, wherein the second rolling bodies guide device is a rolling bodies track along the secondary guide axis.

9. The guidance system of claim 1, wherein the linear actuator comprises a screw-nut system, a ball screw, a cam, a connecting rod, a belt, and/or a rack.

10. The guidance system of claim 1, wherein the at least one first rolling bodies guide device is offset with respect to the second rolling bodies guide device.

11. The guidance system of claim 10, wherein the offset between the at least one first rolling bodies guide device and the second rolling bodies guide device is 45°.

* * * * *